US012657587B2

(12) United States Patent
Kwok et al.

(10) Patent No.: US 12,657,587 B2
(45) Date of Patent: Jun. 16, 2026

(54) SYSTEMS AND METHODS TO USE BEHAVIORAL BIOMETRICS TO DETECT AND DEFEND AGAINST A DIGITAL SCAM-IN-PROGRESS

(71) Applicant: Capital One Services, LLC, McLean, VA (US)

(72) Inventors: Jennifer Kwok, Brooklyn, NY (US); Vyjayanthi Vadrevu, Pflugerville, TX (US); Michael Saia, Weehawken, NJ (US); Viraj Chaudhary, Katy, TX (US); Phoebe Atkins, Midlothian, VA (US); Tyler Maiman, Melville, NY (US); Leeyat Bracha Tessler, Arlington, VA (US); Ray Cheng, Long Island City, NY (US)

(73) Assignee: Capital One Services, LLC, McLean, VA (US)

( * ) Notice: Subject to any disclaimer, the term of this patent is extended or adjusted under 35 U.S.C. 154(b) by 435 days.

(21) Appl. No.: 18/121,364

(22) Filed: Mar. 14, 2023

(65) Prior Publication Data

US 2024/0311831 A1    Sep. 19, 2024

(51) Int. Cl.
*G06Q 20/40* (2012.01)
*G06N 20/00* (2019.01)

(52) U.S. Cl.
CPC ....... *G06Q 20/40145* (2013.01); *G06N 20/00* (2019.01); *G06Q 20/4016* (2013.01)

(58) Field of Classification Search
CPC ......... G06Q 20/40145; G06Q 20/4016; G06N 20/00
See application file for complete search history.

(56) References Cited

U.S. PATENT DOCUMENTS

| | | | | |
|---|---|---|---|---|
| 10,223,875 B1 * | 3/2019 | Mossoba | .............. | G06Q 20/382 |
| 10,643,213 B1 * | 5/2020 | Bermudez | .............. | G06N 3/088 |
| 10,664,842 B1 * | 5/2020 | Bermudez | .......... | G06Q 20/4016 |
| 10,817,804 B1 * | 10/2020 | Ozoka | .................... | G06N 20/00 |
| 11,704,673 B1 * | 7/2023 | Drapeau | ............ | G06Q 20/4016 |
| | | | | 705/72 |
| 11,824,872 B1 * | 11/2023 | Meyer | ................. | G06F 21/6245 |
| 2018/0300572 A1 | 10/2018 | Esman et al. | | |
| 2019/0042988 A1 * | 2/2019 | Brown | ................ | G06F 16/9535 |
| 2021/0019757 A1 * | 1/2021 | Bermudez | ........... | G06F 18/2413 |
| 2021/0342853 A1 * | 11/2021 | Bermudez | ........... | G06Q 20/352 |

(Continued)

FOREIGN PATENT DOCUMENTS

CA    3059487 A1 *    5/2020    ............. G07G 3/003

*Primary Examiner* — Wodajo Getachew
(74) *Attorney, Agent, or Firm* — HUNTON ANDREWS KURTH LLP

(57) ABSTRACT

Systems and methods for preventing fraud using behavioral biometrics may include a server with memory and a processor. The processor may be configured to create a behavioral biometric use-print for a user based on a plurality of observed and recorded user interactions and then monitor one or more behavioral biometrics of the user while the user accesses a user account. These monitored behavioral biometrics may be compared against the behavioral biometric use-print to determine if there are material deviations indicating that the user is under stress. When the server determines that the user is under stress, it may provide an intervention to help safeguard against potential in-process fraud.

14 Claims, 6 Drawing Sheets

(56)     References Cited

U.S. PATENT DOCUMENTS

2021/0390445 A1 *  12/2021  Cheng .................. G06N 3/0442
2022/0019947 A1 *   1/2022  Mitelman .............. G06N 20/00
2022/0381582 A1 *  12/2022  Scheuerman .......... G01C 21/36

* cited by examiner

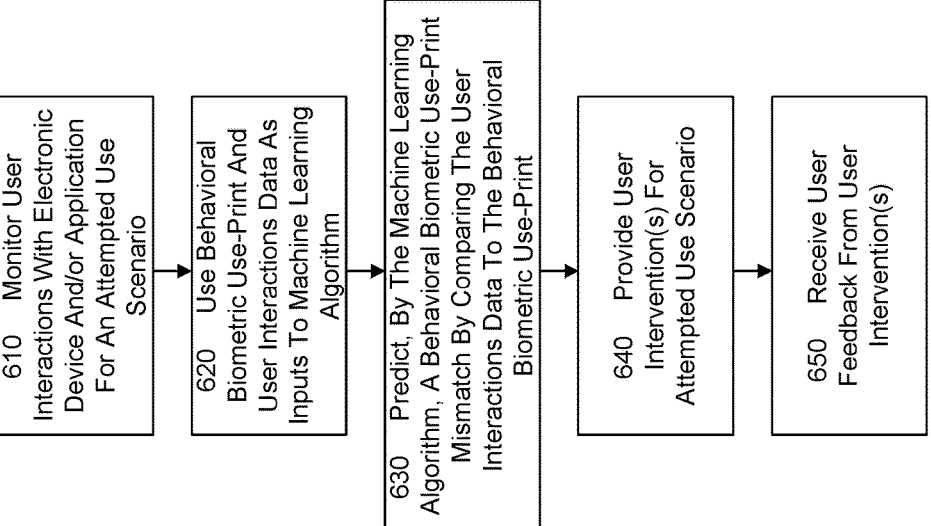

610   Monitor User Interactions With Electronic Device And/or Application For An Attempted Use Scenario 620   Use Behavioral Biometric Use-Print And User Interactions Data As Inputs To Machine Learning Algorithm 630   Predict, By The Machine Learning Algorithm, A Behavioral Biometric Use-Print Mismatch By Comparing The User Interactions Data To The Behavioral Biometric Use-Print 640   Provide User Intervention(s) For Attempted Use Scenario 650   Receive User Feedback From User Intervention(s)

SYSTEMS AND METHODS TO USE BEHAVIORAL BIOMETRICS TO DETECT AND DEFEND AGAINST A DIGITAL SCAM-IN-PROGRESS

FIELD OF THE DISCLOSURE

The present disclosure relates to systems and methods for using behavioral biometrics to detect and defend against a digital scam-in-progress.

BACKGROUND

Attempted fraud and consumer scams are an ever present online danger, and one which quickly morphs and adapts to preventative measures. There have been great advancements in authentication techniques and strategies to raise authentication confidence levels and prevent fraudulent access to consumer accounts by unauthorized third parties.

One particularly troubling area of online fraud and scamming relates to scammers who target innocent consumers and rather than steal their identity and/or authentication credentials, they pressure and trick consumers into to doing something that is against the consumers' interest and which generally scams the consumers out of their own money. This type of scam is particularly problematic because any sort of authentication technology and strategy will be ineffective since the correct consumer is the one authenticating to the user's account and taking the actions which will ultimately perfect the scam against the consumer.

Because this type of scam generally involves actors located at various geographic locations, some measures aimed at combating this type of scam have been implemented based on geographic location. These scams commonly originate at a location remote from the targeted consumer and require the scammer to remote into the user's computer. Accordingly, remote access software companies have begun blocking or restricting the ability for people to remote into computers in the United States and other locations. This preventative measure is clunky because it is potentially over-inclusive, and possibly ineffective because scammers have found work-arounds, such as having the targeted consumer remote into the scammer's computer and then reversing the remote connection. This type of measure, while marginally effective at best, does not address the root of the scam, namely that the mark is tricked into taking detrimental actions, such as transferring or withdrawing funds from his or her account.

These and other deficiencies exist. Accordingly, there is a need for determining when a user may be in the middle of taking detrimental actions based on pressure from a scammer in an ongoing scam.

SUMMARY OF THE DISCLOSURE

Embodiments of the present disclosure provide a method for fraud prevention using behavioral biometrics. The method may include recording, by a processor, a plurality of behavioral biometrics of a user interacting with a user device, generating, by the processor and based on the recorded plurality of behavioral biometrics, a behavioral biometric use-print for the user, storing, in a database, the behavioral biometric use-print, monitoring, by the processor, one or more behavioral biometrics of the user while the user accesses a user account on the user device, applying a machine learning algorithm to the one or more behavioral biometrics of the user and the user's behavioral biometric use-print to determine that there is a material deviation in at least one of the one or more behavioral biometrics from the user's behavioral biometric use-print, determine, by the processor and based on the material deviation, that the user is under stress, providing, by the processor, an intervention to the user device based on the determination that the user is under stress, and receiving user feedback on the intervention, whereby the user feedback is used as an input to the machine learning algorithm to train and refine the machine learning algorithm.

Embodiments of the present disclosure provide a system for using behavioral biometrics to prevent digital scams. The system may include a memory storing a behavioral biometric use-print for a user, and a processor configured to record a plurality of behavioral biometrics of a user interacting with a user device, generate, based on the recorded plurality of behavioral biometrics, the behavioral biometric use-print for the user, monitor one or more behavioral biometrics of the user while the user accesses a user account on the user device, apply a machine learning algorithm to the one or more behavioral biometrics of the user and the user's behavioral biometric use-print to determine that there is a material deviation in at least one of the one or more behavioral biometrics from the user's behavioral biometric use-print, conclude, by the processor and based on the material deviation, that that the user is under stress, provide, by the processor, an intervention to the user device based on the conclusion that the user is under stress, and receive user feedback on the intervention, whereby the user feedback is used as an input to the machine learning algorithm to train and refine the machine learning algorithm.

Embodiments of the present disclosure provide a computer readable non-transitory medium comprising computer-executable instructions that are executed on a processor and comprising the steps of: recording a plurality of behavioral biometrics of a user interacting with a user device, generating, based on the recorded plurality of behavioral biometrics, the behavioral biometric use-print for the user, monitoring one or more behavioral biometrics of the user while the user accesses a user account on the user device, applying a machine learning algorithm to the one or more behavioral biometrics of the user and the user's behavioral biometric use-print to determine that there is a material deviation in at least one of the one or more behavioral biometrics from the user's behavioral biometric use-print, concluding, by the processor and based on the material deviation, that that the user is under stress, providing, by the processor, an intervention to the user device based on the conclusion that the user is under stress, and receiving user feedback on the intervention, whereby the user feedback is used as an input to the machine learning algorithm to train and refine the machine learning algorithm.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Various embodiments of the present disclosure, together with further objects and advantages, may best be understood by reference to the following description taken in conjunction with the accompanying drawings.

FIG. 6 is a flow diagram illustrating a method of using behavioral biometrics to prevent digital scams according to an embodiment of the invention.

DETAILED DESCRIPTION

The following description of embodiments provides non-limiting representative examples referencing numerals to particularly describe features and teachings of different aspects of the invention. The embodiments described will be recognized as capable of implementation separately, or in combination, with other embodiments from the description of the embodiments and the features and teachings of any embodiment can be interchangeably combined with the features and teachings of any other embodiment. A person of ordinary skill in the art reviewing the description of embodiments will be able to learn and understand the different described aspects of the invention. The description of embodiments will facilitate understanding of the invention to such an extent that other implementations, not specifically covered but within the knowledge of a person of skill in the art having read the description of embodiments, will be understood to be consistent with an application of the invention.

Furthermore, the described features, advantages, and characteristics of the embodiments may be combined in any suitable manner. A person of ordinary skill in the art will recognize that the embodiments may be practiced without one or more of the specific features or advantages of an embodiment. In other instances, additional features and advantages may be recognized in certain embodiments that may not be present in all embodiments. A person of ordinary skill in the art will understand that the described features, advantages, and characteristics of any embodiment can be interchangeably combined with the features, advantages, and characteristics of any other embodiment.

The present invention provides systems and methods by which businesses may develop a behavioral biometric use-print for a consumer and then monitor the user's interactions with an electronic device and a webpage or an application within that electronic device to predict material deviations from the established behavioral biometric use-print. Predicting material deviations from an established behavioral biometric use-print may be a useful indicator that a user is under stress due to pressure from a scammer to take detrimental actions such as transferring money from the user's account to the scammer.

Further, the present invention may be capable of providing interventions based on a prediction that a material deviation from an established behavioral biometric use-print exists. The interventions may be context based and may span from pop-up warnings, to changing privileges in the user account, to blocking funds transfers and disabling user access to the user's account.

Further, a machine learning algorithm employed by the systems and methods for using behavioral biometrics to detect and defend against a digital scam-in-progress promotes system efficiency by reducing the demands on backend systems over time to improve the functioning of computers and conserve system resources.

Figure 1:
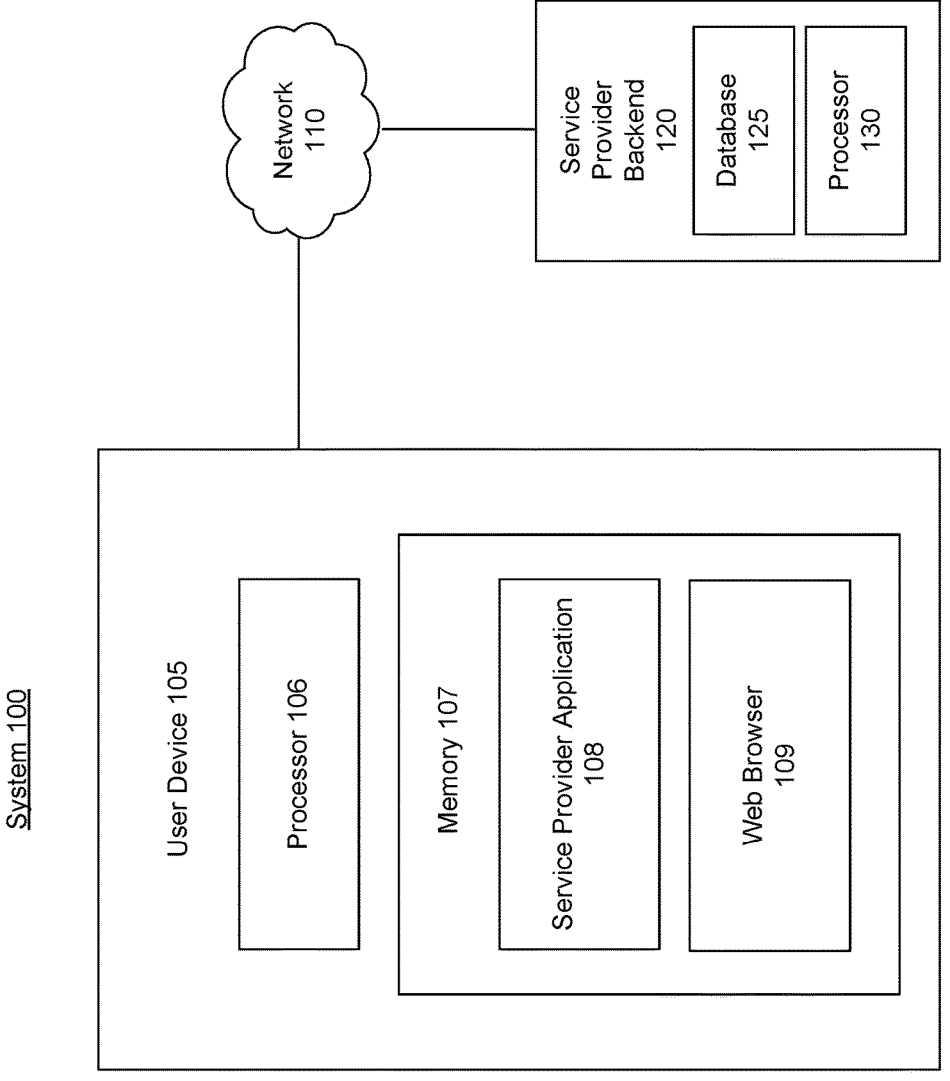
FIG. 1 illustrates a system for using behavioral biometrics to prevent digital scams according to an exemplary embodiment.

FIG. 1 illustrates a system 100 for using behavioral biometrics to prevent digital scams. The system 100 may include a user device 105, a network 110, and a service provider backend 120. Although FIG. 1 illustrates single instances of components of system 100, system 100 may include any number of components.

System 100 may include a user device 105. The user device 105 may include one or more processors 106 and memory 107. Memory 107 may include one or more applications, such as service provider application 108. Memory 107 may also or alternatively include web browser 109 capable of displaying a service provider webpage. The user device 105 may be in data communication with any number of components of system 100. For example, the user device 105 may transmit data via network 110 to processor 130 and/or database 125 of service provider backend 120. Without limitation, the user device 105 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, an ATM, or other device. The device 105 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 105 may include processing circuitry and may contain additional components, including processors, memories, error and parity/CRC checkers, data encoders, anticollision algorithms, controllers, command decoders, security primitives and tamper-proofing hardware, as necessary to perform the functions described herein. The device 105 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a network 110. In some examples, network 110 may be one or more of a wireless networks, a wired network or any combination of wireless network and wired network, and may be configured to connect to any one of components of system 100. For example, the device 105 may be configured to connect to service provider backend 120 via network 110. In some examples, network 110 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 110 may include, without limitation, telephone lines, fiber optics, IEEE Ethernet 902.3, a wide area network, a wireless personal area network, a LAN, or a global network such as the Internet. In addition, network 110 may support an Internet network, a wireless communication network, a cellular network, or the like, or any combination thereof. Network 110 may further include one network, or any number of the exemplary types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more examples, network 110 may comprise a plurality of interconnected networks, such as, for example, the Internet, a service provider's network, a cable television network, corporate networks, such as credit card association networks, and home networks.

System 100 may include service provider backend 120 which may comprise one or more servers. In some examples, the one or more servers may include one or more processors, represented as processor 130 and coupled to memory, represented as database 125. The server(s) may be configured as a central system, server or platform to control and call various data at different times to execute a plurality of workflow actions.

In some examples, the server(s) can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server, it is understood that other embodiments can use multiple servers or multiple computer systems as necessary or desired to support the users and can also use back-up or redundant servers to prevent network downtime in the event of a failure of a particular server.

The server may include an application in memory comprising instructions for execution thereon. For example, the application may comprise instructions for execution on the server. The application may be in communication with any components of system 100. For example, the server may execute one or more applications that enable, for example, network and/or data communications with one or more components of system 100 and transmit and/or receive data. Without limitation, the server may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. The server also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server may include processing circuitry and may contain additional components, including processors, memories, error and parity/CRC checkers, data encoders, anticollision algorithms, controllers, command decoders, security primitives and tamper-proofing hardware, as necessary to perform the functions described herein. The server may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include one or more databases 125. The database 125 may comprise a relational database, a non-relational database, or other database implementations, and any combination thereof, including a plurality of relational databases and non-relational databases. In some examples, the database 125 may comprise a desktop database, a mobile database, or an in-memory database. Further, the database 125 may be hosted internally by any component of system 100 or the database 125 may be hosted externally to any component of the system 100 by a cloud-based platform, or in any storage device that is in data communication with the device 105 and backend 120. In some examples, database 125 may be in data communication with any number of components of system 100. For example, the processor 106 in data communication with the application 108 may be configured to transmit one or more requests for the requested data from database 125 via network 110.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the user device 105, service provider backend 120, and/or database 125, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Figure 2:
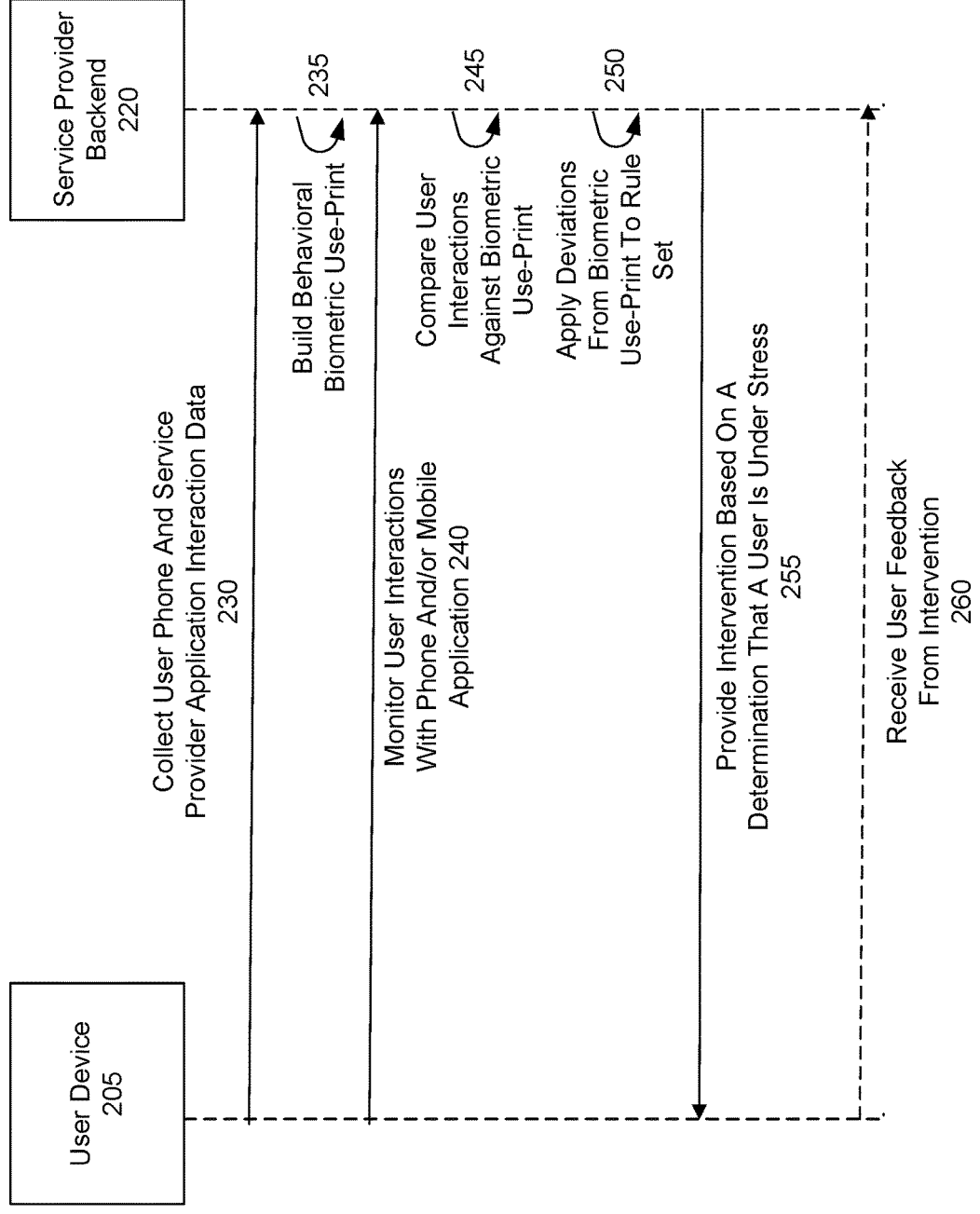
FIG. 2 illustrates a sequence of operations for using behavioral biometrics to prevent digital scams according to an exemplary embodiment.

The sequence diagram of FIG. 2 illustrates an exemplary application of embodiments of the invention in conjunction with the system 100 of FIG. 1. In the scenario set forth in FIG. 2, a user device 205 is in communication with a service provider backend 220. User device 205 may be a personal computer, smart phone, or any other network enabled computing device. User device 205 may also be any wearable such as a smart watch, smart glasses, etc. and may include augmented reality and/or virtual reality. User device 205 may include memory, a network communication, an interactive user interface, and a processor capable of running one or more software applications. Service provider backend 220 may include a database capable of storing historical user interaction and/or response data as well as rules defining if and when a preferred communication with a user might be broken. Service provider backend 220 may also include a processor capable of applying the stored rules to one or more of historical user interaction data and indicia that a user may not be receiving communications from the service provider backend 220.

In the sequence of FIG. 2, a user may have a service provider application installed on user device 205. In a non-limiting embodiment, the service provider may be a financial institution and the service provider application may be focused on providing access to user accounts as well as providing information and facilitating financial transactions and other financial business. In another embodiment, there may be a web browser capable of displaying a service provider webpage installed on user device 205. In the case where the service provider is a financial institution, the webpage may provide the same functionalities as the service provider application.

A user may interact with his or her user device 205 over time. There are a plethora of user interactions. For instance, if user device 205 is a smart phone, then the user may normally hold the phone in a certain hand during use, or may hold the phone in one hand for certain tasks and the other hand for other tasks. The user type with one hand, the other, or both, and the typing may be of a certain pace and/or cadence. The cadence may be word-based, sentence-based, etc. The user may routinely misspell certain words or make repeated grammatical mistakes for certain words, phrases, rules, etc. The user may hold the phone in a certain orientation for various tasks, at certain elevations, with certain pressures in certain screen locations, etc. The user may also use distinct swipe and/or tap speeds, frequencies, cadences, pressures, right-hand vs. left hand swiping, etc. The same is true of zoom-in and zoom-out functions. Other phone specific gestures may be repeatable and therefore distinguishing for a certain user. Eye movements and focus patterns on the smartphone screen may also be monitored and may help distinguish a particular user. Area of contact with the screen and location of contact for certain functions may also help distinguish a particular user. Hand jerkiness or stillness may be monitored with internal smartphone accelerometers and may help distinguish a user's normal smartphone use with use of the smartphone under some type of stress. These are a non-limiting example of some of the characteristics of a user's interaction with a smartphone.

In the event that user device 205 is a desktop or laptop computer, then there are potentially other user interaction characteristics. In the event a laptop or a desktop monitor has a touchscreen, then many of the characteristics described above might apply to the desktop/laptop scenario as well. Additionally, there is keyboard interactions characteristics such as typing speed, cadence, error rates, etc. Just as with the smartphone, the cadence may be word-based, sentence-based, etc. The user may routinely misspell certain words or make repeated grammatical mistakes for certain words, phrases, rules, etc. There may be grammatical stylizations. For example, a user may routinely use double spaces between sentences, use or not use an Oxford comma, etc. The user may select certain type font and sizing, as well as certain text formatting. With a mouse, there may be certain repeatable and distinguishing characteristics. For example, there may be a certain click speed, cadence, movement speed, hover or dwell times, use or not of a middle scroll wheel (including speed, cadence, frequency, etc.), frequency of use of the right mouse button, error rates for clicking, inversion of mouse buttons for left-handed users or for other preference-based reasons, etc. There may be a user preference for a using a track pad over a mouse or other means for pointer control such as a track point on a laptop. Additionally, some laptops include multiple left and right mouse buttons and usage of one set vs the other, or some combination depending on the current user interaction may help distinguish users. Within a web browser on a webpage, there may be webpage-based interaction preferences or user routines/patterns. For example, on a financial institution's webpage, a user might, as a normal course of interaction, review news first, then log into the user's account, then check outstanding credit card balances, current statements, etc. in any number of normal, standard, and/or repeatable order. In addition to browsing pattern, there is scrolling speed, cadence, mouse movements, click cadence and frequency, mouse hover and dwell times, etc. Again, these are a non-limiting example of some of the characteristics of a user's interaction with a desktop/laptop computer.

At step 230, the service provider backend 220 may collect user smartphone and mobile application interaction data. This may comprise any or all of the user interaction data described above as well as other characteristics not discussed. The service provider backend may collect this data through the service provider application and/or an add-on associated with a web browser. This collection may represent a first step in the process of developing a behavioral biometric use-print for a user and it may occur over a period of time. The amount of time required depends on the amount of interaction data collected (e.g., based on use of the user device 205), the value of each piece of data, and the amount of data required to build the behavioral biometric use-print. The amount of data may differ for each user depending on how strongly each interaction type correlates and distinguishes a particular user. For instance, if one user only uses his or her right thumb to type on a smartphone keypad and uses extreme pressure to do so, then this may be a better differentiator than a user who uses both hands to type and uses average or normal pressure. For the latter user, more data may need to be collected to create a stronger behavioral biometric use-print. The collected interaction data may be stored in a database within service provider backend 220.

At step 235, service provider backend 220 may build a behavioral biometric use-print for the user of user device 205. The behavioral biometric use-print may be built based on the interaction data collected at step 230 and stored in the service provider backend 220 database. The behavioral biometric use-print data may be a combination of the exact interaction data collected in step 230 as well as metrics distilled from the user interaction data. The behavioral biometric use-print may uniquely distinguish the user from any number of other users based solely on how that user interacts with user device 205, and not based on any immutable characteristic of the user him or herself. For instance, many users may use both hands to type on a smartphone while using average input pressure, but fewer users do that while also misspelling a specific word in a specific manner on a regular basis, and even fewer users do those two things while also using a specific typing speed and cadence. While these few characteristics alone are unlikely to uniquely distinguish one user from the world of other users, there are many additional interactions characteristics capable of being monitored, and as each additional characteristic is added to the mix, the behavioral biometric use-print becomes more robust in its ability to uniquely identify a single user. Moreover, a behavioral biometric use-print may not need to uniquely identify a single user vis-à-vis every other user in order to provide value in certain uses such as fraud-prevention. In this example, we are concerned with two potential scenarios. The first is that someone other that the user is pretending to be the user to perpetuate a fraud. In that scenario, the likelihood that the fraudster's interactions with user device 205 would be similar enough to the user's behavioral biometric use-print is highly unlikely if the behavioral biometric use-print is robust enough. That is true regardless of whether the behavioral biometric use-print is capable of uniquely identifying the user from the world of users, on an absolute basis. The second scenario is if the correct user has and is using user device 205, but is being pressured to do certain things on user device 205 by a third-party fraudster as part of a fraud-in-progress. In this scenario, we are not concerned with distinguishing the user from the world of other potential users, but rather we are concerned whether the user's interactions deviate from the baseline interaction data contained within the behavioral biometric use-print. Of course, there may be deviations in some or even most user interactions because this type of interaction data is rarely repeatable at a 100% rate. However, the degree of a given deviation and the number of deviations matter and are independent of whether the behavioral biometric use-print can uniquely distinguish a particular user from all other users.

At step 240, the service provider backend 220 may monitor user interactions. These interactions may be within a service provider application or within a service provider webpage, but may also be with respect to general usage of user device 205. In one scenario, a user may be attempting to access one of his or her financial accounts within a service provider application for the purpose of making a funds transfer. The user may tap on the application icon with a certain finger, taking up a certain amount of area on the screen, and with a certain pressure. The application may open and the user may immediately click on a link for logging into the user's financial account. This link may, in turn, present a prompt for login credentials, such as user name and password. The user may enter a user name by typing on the virtual keyboard on the screen of user device 205. The user may type the user name with either or both hands. The user may type with a certain speed and/or cadence. The user may enter the user name as intended, or make one or more mistakes that the user must correct. The same is true when entering the password, the user may, or may not, elect to show the password on the user's screen, may make one or more typos or enter the incorrect password a number of times before entering the correct password. Each of these steps may be completed while holding the phone with a given level of pressure and a certain level of stability (i.e., presence of or lack of jitter), as well holding the phone in a certain orientation (e.g., elevation, attitude, etc.). Step 240 may monitor and collect this interaction data, as well as other interaction data not explicitly discussed.

At step 245, the monitored and collected interaction data from step 240 may be compared against the behavioral biometric use-print. This comparison may entail comparing similar interaction data points for deviations. For instance, the behavioral biometric use-print may include a typing speed and the monitored interaction data may also include a typing speed. Those two typing speeds may be compared at step 245. In the example provided above where a user is attempting to access a financial account for the purpose of a funds transfer, there are many interaction datapoints that may be compared to the user's behavioral biometric use-print. For instance, the service provider backend 220 monitored application selection data including contact pressure and finger contact area. This may be compared against standardized application selection data for the user in the behavioral biometric use-print. Use patterns may also be compared when the user immediately clicks on the account login link once the application opens. The behavioral biometric use-print may include standard application use patterns for comparison. Once the login link is selected, in addition to typing speed, typing cadence may be compared against a standard as well as error rates and patterns for misspellings, password mis-entry etc. All of the interaction data monitored in the financial account login attempt may be compared with user standards existing within the behavioral biometric use-print. The behavioral biometric use-print may also include average deviation rates from certain interaction data so that immaterial deviations may be ignored. For example, if a user's standard typing speed is 100 words per minute, then the behavioral biometric use-print may also include a range that is +/−8 words per minute. The same sort of deviations may be included in other behavioral biometrics such as hand jitter when holding a smart phone, application selection pressure, scrolling speeds, etc. The comparison may look at differences between the values of the compared metrics, the differences outside of the normal variation of the metrics in the behavioral biometric use-print, both, or some other comparative measure. Any number of interactions metrics may be compared, and this number may be dictated by a set of rules, by a learning algorithm, etc. A set of rules may be devised at any level of granularity for a given set of circumstances. For instance, in the scenario where a user is attempting a funds transfer from the user's account, a more critical comparison may be contemplated than a scenario where the user is simply checking an account balance. Other rules may be contemplated and/or applied to the comparison step.

As noted, there may be one or more sets of rules guiding this process with respect to the comparing step 245, and step 250. At step 250, deviations detected in the step 245 comparison may be applied to a rule set. This step may be utilized to determine if there is a mismatch between the user's interactions at step 240 and the behavioral biometric use-print. The determination of a mismatch may be the result of some number of deviations in specific behavioral biometrics and a determination that one or more of those deviations is material. The rule set(s) may define the number of behavioral biometrics to compare, the absolute number of deviations for compared behavioral biometrics, a deviation rate or degree of divergence for compared behavioral biometrics given a number of compared behavior biometrics, etc. These rules may be dependent on various use cases such as the example above where the user is attempting a funds transfer, or a scenario where the user is attempting to pay a bill, review a balance, obtain a credit report, etc. In one embodiment, the more risky the attempted use, the more stringent the rule set. The word "risky" in this sense may indicate the possibility for financial loss, identity theft, etc., and "stringent" may indicate a requirement for comparing a higher number of behavioral biometrics, a lower number of deviations, and/or a lower deviation rate. In addition to the number of comparisons, and deviations, the rules may define materiality. As discussed, there may be deviations on any number of behavioral biometrics when compared with the behavioral biometric use-print stemming from normal use-based fluctuation in many of the behavioral biometrics. The rule set(s) may define what is acceptable "normal" deviation with respect to any given behavioral biometric. The rules may further define, for a given use scenario, how many deviations in behavioral biometrics must be material in order to conclude there is a behavioral biometric use-print mismatch. It is possible for the rules to dictate that all deviations be material in order to conclude a behavioral biometric use-print mismatch. However, it is also possible that the rule set(s) may, for various use-based instances, provide for some combination of material and non-material deviations to ultimately result in a behavioral biometric use-print mismatch conclusion. The rules may be based on observations and data over time and may change based on these observations.

A conclusion of a behavioral biometric use-print mismatch may result in one of two determinations. The first is that the person who is using the user device 205 is not the user (e.g., a scammer who making unauthorized use of user device 205), and the second is that the user is under stress. The stress may be a result of any number of factors such as paying a large bill or pressure from a third-party to perform some financial action. The comparison at step 245 and the application of the rule set(s) to the comparison at step 250 may be sufficient to weed out instances of user stress stemming from situations such as paying a large bill. This is because those instances should be accounted for in the behavioral biometric use-print through the user interaction data collected over time. Thus, the behavioral biometric use-print should appreciate that a particular user feels stress when paying a large bill and the surrounding behavioral biometrics should reflect that stress in a measurable way. Additionally, service provider backend 220 may have visibility into the use-case so that it may be known that the user is attempting to pay a large bill and therefore already anticipate a heightened stress level. The remaining, and unaccounted-for cause of increased user stress is pressure by a third-party to take some sort of financial action. This is the sort of scenario that service provider backend 220 may want to detect and control. When service provider backend 220 concludes a behavioral biometric use-print mismatch and determines that a user is under stress, then in step 255, service provider backend 220 may provide an intervention to user device 205. The intervention may take many forms and may be dependent on the attempted use-scenario. For example, the intervention may be directed toward a change to privileges in the user account, such as if the user is attempting to change his or her personal information including a login password, the intervention may be a temporary disablement of the password change function, sending out notification/verification communications through secondary means such as text message, email, etc., requiring step-up authentication, pop-up dialogue boxes, reducing credit limits, lowering transfer amount maximums, lowering cash advance maximums etc. In the use-scenario where a user is attempting a funds transfer, the intervention may include many of these same interventions, but the specific intervention may be dictated by the attempted transfer amount, the degree to which there was a behavioral biometric use-print mismatch (e.g., the level of user stress), etc. Moreover, pop-ups and other communication attempts may include warnings, questions, etc. In one instance, a pop-up dialogue box may inquire if the user's actions are being currently being prompted by any third-party. In another embodiment, a pop-up may simply provide a notification warning that the system suspects outside influence in the current attempted financial transaction and there may be a fraud in-progress. Other notifications, warnings, and/or questions may be provided. Furthermore, there may be more than one intervention and the interventions may ramp up in number and severity based on the attempted use and the amount of time available to intervene. Service provider backend 220 must strike a balance between preventing fraud and becoming a nuisance to the user. If there is a large behavioral biometric use-print mismatch and the user is attempting a withdraw or transfer, then the system may ramp up the intervention more quickly, including blocking the attempted financial transaction. However, if the user is slowly progressing toward a financial withdraw or transfer with a small or average behavioral biometric use-print mismatch, then service provider backend 220 may take a slower approach to its intervention at step 255.

At step 260, there may be feedback from the user based on the intervention provided by service provider backend 220. For example, if the intervention was a pop-up box with a question or verification, then service provider backend 220 would anticipate a user response at step 260 before the attempted use continues. In some instances, there may not be any user feedback, such as the case where informational pop-ups or information communications through secondary channels are sent. In instances where the intervention is a disablement of the attempted use, there may not be direct feedback to service provider backend 220, but there may be some contact required from the user to reestablish trust for the use-scenario.

In some embodiments, it may be desirable to employ machine learning to determine if and when a user is under stress, thereby indicating the possibility for a fraud in-progress. The sequence diagram of FIG. 3 illustrates an exemplary scenario in which the backend utilizes a machine learning algorithm as well as other structure for attempting to determine increased user stress through a behavioral biometric use-print mismatch.

Figure 3:
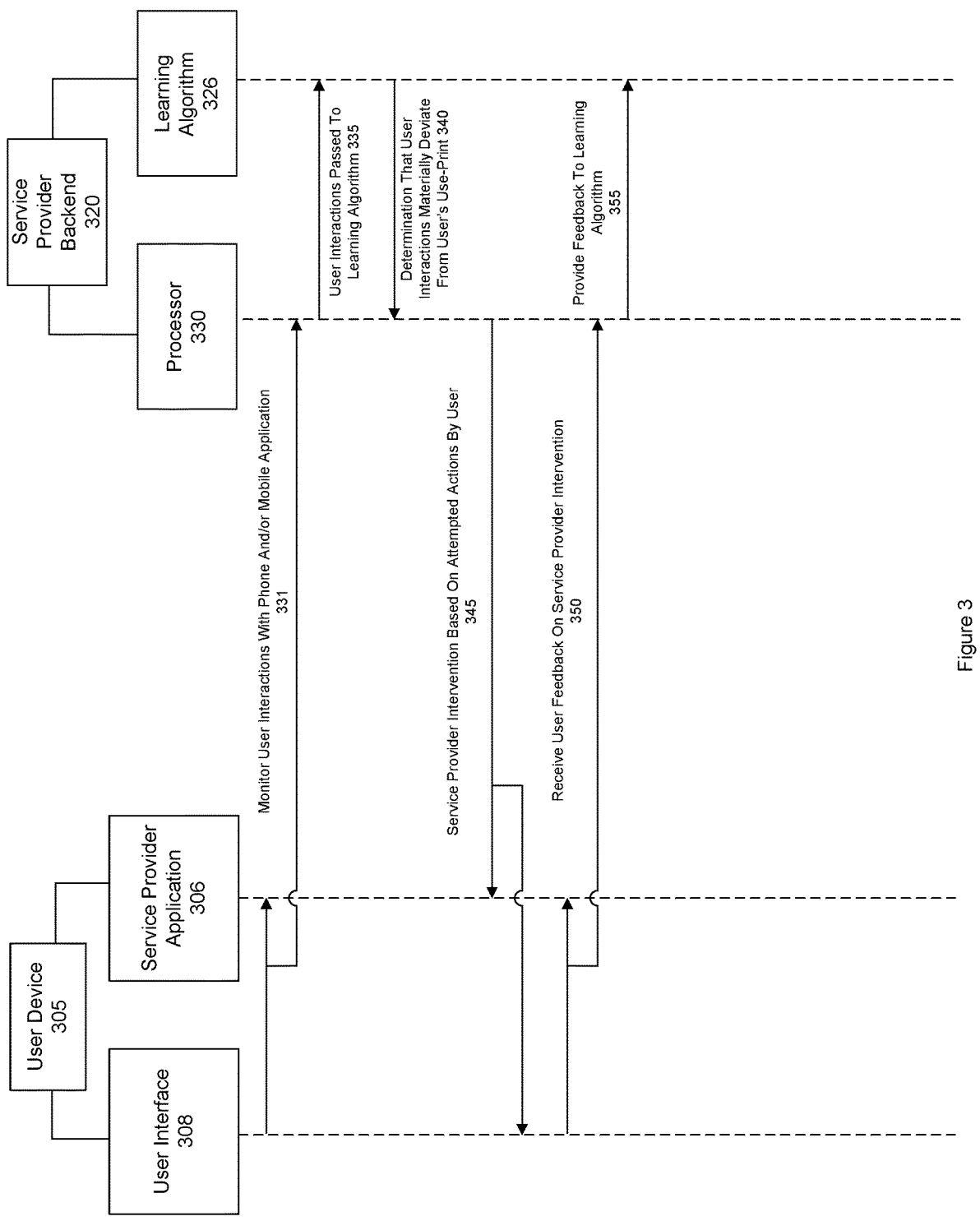
FIG. 3 illustrates a sequence of operations for using behavioral biometrics to prevent digital scams according to an exemplary embodiment.

The sequence diagram of FIG. 3 illustrates an exemplary application of embodiments of the invention in conjunction with the system 100 of FIG. 1. In the scenario set forth in FIG. 3, a user device 305 may include user interface 308 as well as a service provider application 306. The user device 305 is in communication with a service provider backend 320. User device 305 may be a personal computer, smart phone, smart watch, or any other network enabled computing device. User device 305 may include memory, a network communication, an interactive user interface, and a processor capable of running one or more software applications. Service provider backend 320 may include a processor 330 and a learning algorithm 326 capable of making determinations as to if and when there is a behavioral biometric use-print mismatch indicating that a user is under stress.

In the sequence of FIG. 3, a user may have service provider application 306 installed on user device 305. In another embodiment, there may be a web browser installed on user device 305 capable of displaying a service provider webpage. Service provider backend 320 may be capable of monitoring user interactions with user device 305 through user interface 308 as well as interactions specifically within service provider application 306 and/or through a service provider website. Service provider backend 320 may have a memory/database capable of storing monitored user inter-actions data as well as compiled behavioral biometric use-prints based on the user interactions data.

At step 331, the service provider backend 320 may monitor user interactions. These interactions may be within a service provider application or within a service provider webpage, but may also be with respect to general usage of user device 305. If user device 305 is a smart phone, then the user may normally hold the phone in a certain hand during use, or may hold the phone in one hand for certain tasks and the other hand for other tasks. The user type with one hand, the other, or both, and the typing may be of a certain pace and/or cadence. The cadence may be word-based, sentence-based, etc. The user may routinely misspell certain words or make repeated grammatical mistakes for certain words, phrases, rules, etc. The user may hold the phone in a certain orientation for various tasks, at certain elevations, with certain pressures in certain screen locations, etc. The user may also use distinct swipe and/or tap speeds, frequencies, cadences, pressures, right-hand vs. left hand swiping, etc. The same is true of zoom-in and zoom-out functions. Other phone specific gestures may be repeatable and therefore distinguishing for a certain user. Eye movements and focus patterns on the smartphone screen may also be monitored and may help distinguish a particular user. Area of contact with the screen and location of contact for certain functions may also help distinguish a particular user. Hand jerkiness or stillness may be monitored with internal smartphone accel-erometers and may help distinguish a user's normal smart-phone use with use of the smartphone under some type of stress. These are a non-limiting example of some of the characteristics of a user's interaction with a smartphone.

In the event that user device 305 is a desktop or laptop computer, then there are potentially other user interaction characteristics. In the event a laptop or a desktop monitor has a touchscreen, then many of the characteristics described above might apply to the desktop/laptop scenario as well. Additionally, there is keyboard interactions characteristics such as typing speed, cadence, error rates, etc. Just as with the smartphone, the cadence may be word-based, sentence-based, etc. The user may routinely misspell certain words or make repeated grammatical mistakes for certain words, phrases, rules, etc. There may be grammatical stylizations. For example, a user may routinely use double spaces between sentences, use or not use an Oxford comma, etc. The user may select certain type font and sizing, as well as certain text formatting. With a mouse, there may be certain repeatable and distinguishing characteristics. For example, there may be a certain click speed, cadence, movement speed, hover or dwell times, use or not of a middle scroll wheel (including speed, cadence, frequency, etc.), frequency of use of the right mouse button, error rates for clicking, inversion of mouse buttons for left-handed users or for other preference-based reasons, etc. There may be a user prefer-ence for a using a track pad over a mouse or other means for pointer control such as a track point on a laptop. Addition-ally, some laptops include multiple left and right mouse buttons and usage of one set vs the other, or some combi-nation depending on the current user interaction may help distinguish users. Within a web browser on a webpage, there may be webpage-based interaction preferences or user rou-tines/patterns. For example, on a financial institution's webpage, a user might, as a normal course of interaction, review news first, then log into the user's account, then check outstanding credit card balances, current statements, etc. in any number of normal, standard, and/or repeatable order. In addition to browsing pattern, there is scrolling speed, cadence, mouse movements, click cadence and fre-quency, mouse hover and dwell times, etc. Again, these are a non-limiting example of some of the characteristics of a user's interaction with a desktop/laptop computer.

In one embodiment, a user may be attempting to access one of his or her financial accounts within a service provider application for the purpose of making a funds transfer. The user may tap on the application icon with a certain finger, taking up a certain amount of area on the user interface 308, and with a certain pressure. The application may open and the user may immediately click on a link for logging into the user's financial account. This link may, in turn, present a prompt for login credentials, such as user name and pass-word. The user may enter a user name by typing on a virtual keyboard on user interface 308 of user device 305. The user may type the user name with either or both hands. The user may type with a certain speed and/or cadence. The user may enter the user name as intended, or make one or more mistakes that the user must correct. The same is true when entering the password, the user may, or may not, elect to show the password on the user's screen, may make one or more typos or enter the incorrect password a number of times before entering the correct password. Each of these steps may be completed while holding the phone with a given level of pressure and a certain level of stability (i.e., presence of or lack of jitter), as well holding the phone in a certain orientation (e.g., elevation, attitude, etc.). Step 331 may monitor and collect this interaction data, as well as other interaction data not explicitly discussed.

Service provider backend 320 may employ a learning algorithm 326 implemented by the processor 330 associated with service provider backend 320 to predict when there is a behavioral biometric use-print mismatch with the moni-tored user interaction data at step 331. Service provider backend 320 may store historical user interaction data in a database connected to learning algorithm 326. The database may also store a behavioral biometric use-print for each user, and this behavioral biometric use-print may consist of compiled historical user interaction data (e.g., historical user a behavioral biometric data). The behavioral biometric use-prints may include raw behavior biometrics data from observed historical user interactions as well as metrics derived from behavioral biometrics. A behavioral biometric use-print may be used by learning algorithm 326 to predict when a there is a behavioral biometric use-print mismatch with user interactions monitored at step 331. Learning algorithm 326 may accept user interactions from step 335 as an input as well as the corresponding behavioral biometric use-print. The learning algorithm 326 may then compare the behavioral biometric use-print with the user interactions from step 335 to determine and predict if there is a behav-ioral biometric use-print mismatch at step 340. The com-parison may entail comparing similar interaction data points for deviations. For instance, the behavioral biometric use-print may include a typing speed and the monitored inter-action data may also include a typing speed, and those two typing speeds may be compared. In the example provided above where a user is attempting to access a financial account for the purpose of a funds transfer, there are many interaction datapoints that may be compared to the user's behavioral biometric use-print. For instance, software appli-cation selection data including contact pressure and finger contact area. This data may be compared against standard-ized application selection data for the user in the behavioral biometric use-print. Use patterns may also be compared when the user immediately clicks on the account login link once the application opens. The behavioral biometric use-print may include standard application use patterns for comparison. Once the login link is selected, in addition to typing speed, typing cadence may be compared against a standard as well as error rates and patterns for misspellings, password mis-entry etc. All of the interaction data monitored in the financial account login attempt may be compared with user standards existing within the behavioral biometric use-print. The behavioral biometric use-print may also include average deviation rates from certain interaction data so that immaterial deviations may be ignored. For example, if a user's standard typing speed is 100 words per minute, then the behavioral biometric use-print may also include a range that is +/−8 words per minute. The same sort of deviations may be included in other behavioral biometrics such as hand jitter when holding a smart phone, application selection pressure, scrolling speeds, etc. The comparison may look at differences between the values of the compared metrics, the differences outside of the normal variation of the metrics in the behavioral biometric use-print, both, or some other comparative measure. Importantly, the learning algorithm may develop an understanding of relationships and dependencies between and among the numerous behavioral biometrics. Some of these relationships and dependencies may be specific to a certain user's behavioral biometrics, and others may be applicable on a global basis.

In making a behavioral biometric use-print mismatch determination, the learning algorithm 326 may consider the risk level of a given user interaction attempt (e.g., what is the user attempting to do within service provider application 306 or a service provider webpage), the size of the behavioral biometric use-print, the amount of data in the user interactions data from steps 331 and 335, relationships between metrics, between metrics and the interaction attempt, etc. The learning algorithm may weight each metric and make predictions based on a complex analysis of all metrics, relative deviation in each metric, summing or subtracting deviations based on relationships with other metrics, increasing or decreasing relative weights based on established relationships between and among metrics, etc. The machine learning algorithm 326 may also adjust weighting and relationships based on feedback from previous predictions. Learning algorithm 326 may be able to test detected relationships and analyses based on these relationships through feedback on predictions over time. In some embodiments, there may be a hybrid approach where some number of baseline rules are programmed and then learning algorithm 326 operates and makes predictions on top of that baseline set of rules. The baseline set of rules may include boundary rules when the machine learning algorithm 326 must, or must not, conclude the existence of a behavioral biometrics use-print mismatch.

A prediction by learning algorithm 326 of a behavioral biometric use-print mismatch may result in one of two determinations. The first is that the person who is using the user device 305 is not the user (e.g., is a scammer who making unauthorized use of user device 305), and the second is that the user is under stress. The stress may be a result of any number of factors such as paying a large bill or pressure from a third-party to perform some financial action. The learning algorithm 326 should be capable of determining the difference between the sources of user stress as a result of the comparison and analysis of user interaction data with the behavioral biometric use-print. This is because stresses such as those resulting from a user paying a large bill should be accounted for in the behavioral biometric use-print through the user interaction data collected over time, and the learning algorithm may take this into account in its analysis of material deviations from the behavioral biometric use-print. Thus, the behavioral biometric use-print should account for the fact that a particular user feels stress when paying a large bill and the surrounding behavioral biometrics should reflect that stress in a measurable way that is understood and appreciated by learning algorithm 326. Additionally, learning algorithm 326 may have visibility into the use-case from which the user interaction data is collected. So it may be known that the user is attempting to pay a large bill, and therefore, learning algorithm 326 may already anticipate a heightened stress level. The remaining, and unaccounted-for cause of increased user stress is pressure by a third-party to take some sort of financial action. This is the sort of scenario that service provider backend 320 may want to detect and control/prevent. When learning algorithm 326 predicts a behavioral biometric use-print mismatch and determines that a user is under stress, then in step 345, service provider backend 320 may provide an intervention to user device 305. The intervention may take many forms and may be dependent on the attempted use-scenario. For example, if the user is attempting to change his or her personal information including a login password, the intervention may be a temporary disablement of the password change function, sending out notification/verification communications through secondary means such as text message, email, etc., step-up authentication, pop-up dialogue boxes, etc. In the use-scenario where a user is attempting a funds transfer, the intervention may include many of these same interventions, but the specific intervention may be dictated by the attempted transfer amount, the degree to which there was a behavioral biometric use-print mismatch (e.g., the level of user stress), etc. Moreover, pop-ups and other communication attempts may include warnings, questions, etc. In one instance, a pop-up dialogue box may inquire if the user's actions are being currently being prompted by any third-party. In another embodiment, a pop-up may simply provide a notification warning that the system suspects outside influence in the current attempted financial transaction and there may be a fraud in-progress. Other notifications, warnings, and/or questions may be provided. Furthermore, there may be more than one intervention and the interventions may ramp up in number and severity based on the attempted use and the amount of time available to intervene. Service provider backend 320 must strike a balance between preventing fraud and becoming a nuisance to the user. If there is a large behavioral biometric use-print mismatch and the user is attempting a withdraw or transfer, then the system may ramp up the intervention more quickly, including blocking the attempted financial transaction. However, if the user is slowly progressing toward a financial withdraw or transfer with a small or average behavioral biometric use-print mismatch, then service provider backend 320 may take a slower approach to its intervention at step 345. The type, number, ramp rate, etc. of the service provider intervention may also be a function of learning algorithm 326. Learning algorithm 326 may predict the most effective intervention strategy based on all the data available on the type of attempted user interaction, the degree to which there was a behavioral biometric use-print mismatch, the speed of the user interaction, etc. The intervention strategy predictions may also be refined through feedback over time.

At step 350, there may be feedback from the user based on the intervention provided by service provider backend 320. For example, if the intervention was a pop-up box with a question or verification, then service provider backend 320 would anticipate a user response at step 350 before the attempted use continues.

At step 355, the feedback is provided to learning algorithm 326 to train, further refine, and improve the learning algorithm 326. The user feedback data may help train the machine learning algorithm in a variety of different ways. For example, if the user feedback is indicates an incorrect prediction, for example, a negative response to a pop-up with a question about third-party influence, then the learning algorithm 326 will be able to refine the predictions and change/optimize weighting and relationships that led to the incorrect prediction. This includes an incorrect prediction that there was user stress, or the possibility that there was increased user stress, but that it was attributable to some other factor that was not controlled for by the behavioral biometric use-print. The same may be true for feedback indicating that learning algorithm 326 correctly predicted increased user stress due to third-party pressure. This feedback may be useful to more positively reinforce correct predictions, or to make refinements in the case where learning algorithm 326 may have made the correct prediction, but for faulty reasons. This may include changing weighting for factors that more strongly favor the correct analysis, etc. The foregoing are examples of how the user feedback data may be used by the learning algorithm 326 and are not meant to be exhaustive.

With continued feedback and training of the learning algorithm 326 over time, the learning algorithm 326 may not only become more accurate, but also more efficient. This is because less computing resources are required as the machine learning algorithm becomes more confident in its predictions. Thus, not only is the accuracy of the predictions improved over time, but the functioning of the computer is also improved over time as the learning algorithm 326 is trained.

Figure 4:
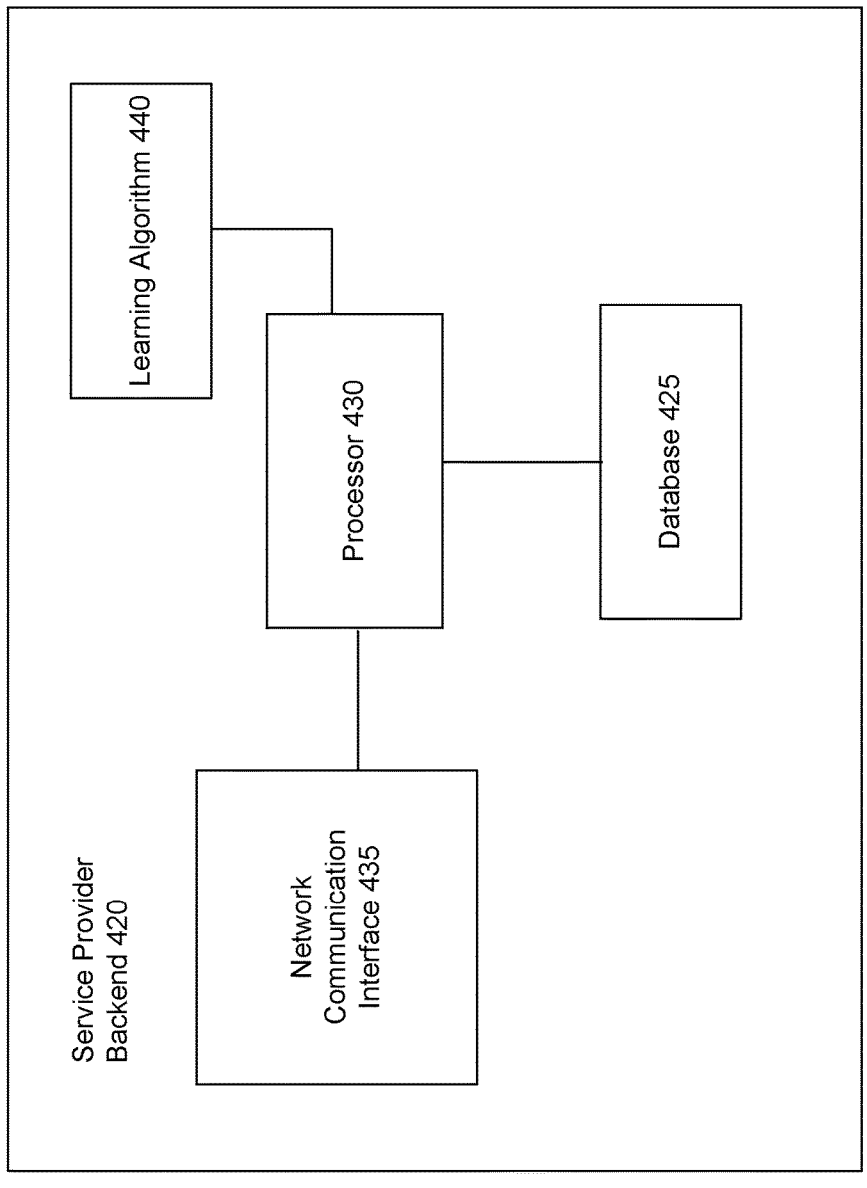
FIG. 4 is a schematic representation of an application backend according to an exemplary embodiment.

With reference to FIG. 4, service provider backend 420 may be a server such as a dedicated server computer, such as bladed servers, or personal computer, laptop computer, notebook computer, palm top computer, network computer, or any processor-controlled device capable of supporting the system 100. While FIG. 4 illustrates a service provider backend 420 that may be a single server, it is understood that other embodiments can use multiple servers or multiple computer systems as necessary or desired to support the users and can also use back-up or redundant servers to prevent network downtime in the event of a failure of a particular server. In a particular embodiment illustrated in FIG. 4, service provider backend 420 includes a processor 430 in communication with a database 425, a network communication interface 435, and a learning algorithm 440. The processor 430 may include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The database 425 may comprise memory and can be a read-only memory, write-once read-multiple memory or read/write memory, e.g., RAM, ROM and EEPROM, and the user device can include one or more of these memories.

The network communication interface 435 is configured to establish and support wired and/or wireless data communication capability for connecting the service provider backend 420 to the network 110 or other communication network. The network communication interface 435 can also be configured to support communication with a short-range wireless communication interface, such as Bluetooth.

In embodiments of the invention, the processor 430 may be in communication, through network communication interface 435, with a service provider application running on a user device in order to monitor and collect user interactions which may comprise behavioral biometrics. This monitoring may occur over a period of time in order to collect enough behavioral biometrics to create a robust behavioral biometric use-print. A user may exhibit variance in different behavioral biometric from time to time, so enough data may need to be collected to not only cover enough distinct behavioral biometrics, but also the variance within each behavioral biometric. For instance, in ten different instances of a user typing on a virtual keyboard on the screen of a smartphone, the user may type at different speeds each time depending on the circumstances. In some cases, the user may be rushed and is typing faster than the user's normal typing speed. In other instances, the user may be distracted and typing much slower than the user's normal speed. In the case where the user is typing faster than normal, the user may make unusual spelling or grammatical errors and in the case where the user is typing slower than normal, the user may be using a single hand when he or she normally uses two hands. All of this is variance within each of the potential behavioral biometrics and therefore, enough data may need to be collected to understand and account for what may be considered the user's normal variance. Once sufficient data is collected, processor 430 may establish a behavioral biometric use-print. In another embodiment, processor 430 may immediately establish a user's behavioral biometric use-print and refine/add to that behavioral biometric use-print over time as additional monitored user interaction data becomes available. In some instances, the behavioral biometric use-print may serve to uniquely distinguish the user from all other users. In some embodiments, the behavioral biometric use-print may be sufficient to distinguish the user from a third-party fraudster, and in yet other embodiments, the behavioral biometric use-print may be sufficient to identify when the user's behavioral biometrics materially differ from that user's behavioral biometric use-print. This material deviation from the user's behavioral biometric use-print may be due to stress from pressure exerted by a third-party committing a fraud in-progress. Processor 430 may store the behavioral biometric use-print in database 425.

In addition to establishing a behavioral biometric use-print, service provider backend 420 may determine behavioral biometric use-print mismatches in order to prevent fraudulent behavior. Processor 430 may be in communication, through network communication interface 435, with a service provider application running on a user device in order to monitor and collect user interactions data relative to a specific use scenario. For example, use scenarios for a use of a financial application might include an account login attempt, a money transfer, a withdraw of funds, etc. In one scenario, a user may attempt to access one of his or her financial accounts within a service provider application for the purpose of making a funds transfer. The user may tap on the application icon with a certain finger, taking up a certain amount of area on the screen, and with a certain pressure. The application may open and the user may immediately click on a link for logging into the user's financial account. This link may, in turn, present a prompt for login credentials, such as user name and password. The user may enter a user name by typing on the virtual keyboard on the screen of user device 205. The user may type the user name with either or both hands. The user may type with a certain speed and/or cadence. The user may enter the user name as intended, or make one or more mistakes that the user must correct. The same is true when entering the password, the user may, or may not, elect to show the password on the user's screen, may make one or more typos or enter the incorrect password a number of times before entering the correct password. Each of these steps may be completed while holding the phone with a given level of pressure and a certain level of stability (i.e., presence of or lack of jitter), as well holding the phone in a certain orientation (e.g., elevation, attitude, etc.). Processor 430 may collect and/or receive this interaction data, as well as other interaction data not explicitly discussed.

This interaction data may be passed onto learning algorithm 440 where it may be used as an input. Learning algorithm 440 may access the user's behavioral biometric use-print from database 425 and use that as another input. Machine learning algorithm 440 may predict whether there is a behavioral biometric use-print mismatch based on a comparison of the user's interaction data for the use-scenario with the user's behavioral biometric use-print.

Upon prediction of a behavioral biometric use-print mismatch, the service provider backend may conclude that the user is under stress and processor 430 may provide one or more interventions. The intervention(s) may take many forms and may be dependent on the attempted use-scenario. For example, if the user is attempting to change his or her personal information including a login password, the intervention may be a temporary disablement of the password change function, sending out notification/verification communications through secondary means such as text message, email, etc., step-up authentication, pop-up dialogue boxes, etc. In the use-scenario where a user is attempting a funds transfer, the intervention may include many of these same interventions, but the specific intervention may be dictated by the attempted transfer amount, the degree to which there was a behavioral biometric use-print mismatch (e.g., the level of user stress), etc. Moreover, pop-ups and other communication attempts may include warnings, questions, etc. In one instance, a pop-up dialogue box may inquire if the user's actions are being currently being prompted by any third-party. In another embodiment, a pop-up may simply provide a notification warning that the system suspects outside influence in the current attempted financial transaction and there may be a fraud in-progress. Other notifications, warnings, and/or questions may be provided. Furthermore, there may be more than one intervention and the interventions may ramp up in number and severity based on the attempted use and the amount of time available to intervene. Service provider backend 420 may need to strike a balance between preventing fraud and becoming a nuisance to the user. If there is a large behavioral biometric use-print mismatch and the user is attempting a funds withdraw or funds transfer, then the system may ramp up the intervention more quickly, including blocking the attempted financial transaction. However, if the user is slowly progressing toward a financial withdraw or transfer with a small or average behavioral biometric use-print mismatch, then service provider backend 420 may take a slower approach to its intervention. The type, number, ramp rate, etc. of the service provider intervention may also be a function of learning algorithm 440. Learning algorithm 440 may predict the most effective intervention strategy based on all the data available on the type of attempted user interaction, the degree to which there was a behavioral biometric use-print mismatch, the speed of the user interaction, etc. The intervention strategy predictions may also be refined through feedback over time.

The service provider backend 420 may receive feedback, via network communication interface 435, on the intervention(s). This feedback may be shared with learning algorithm 440 in order to train and improve learning algorithm 440.

Figure 5:
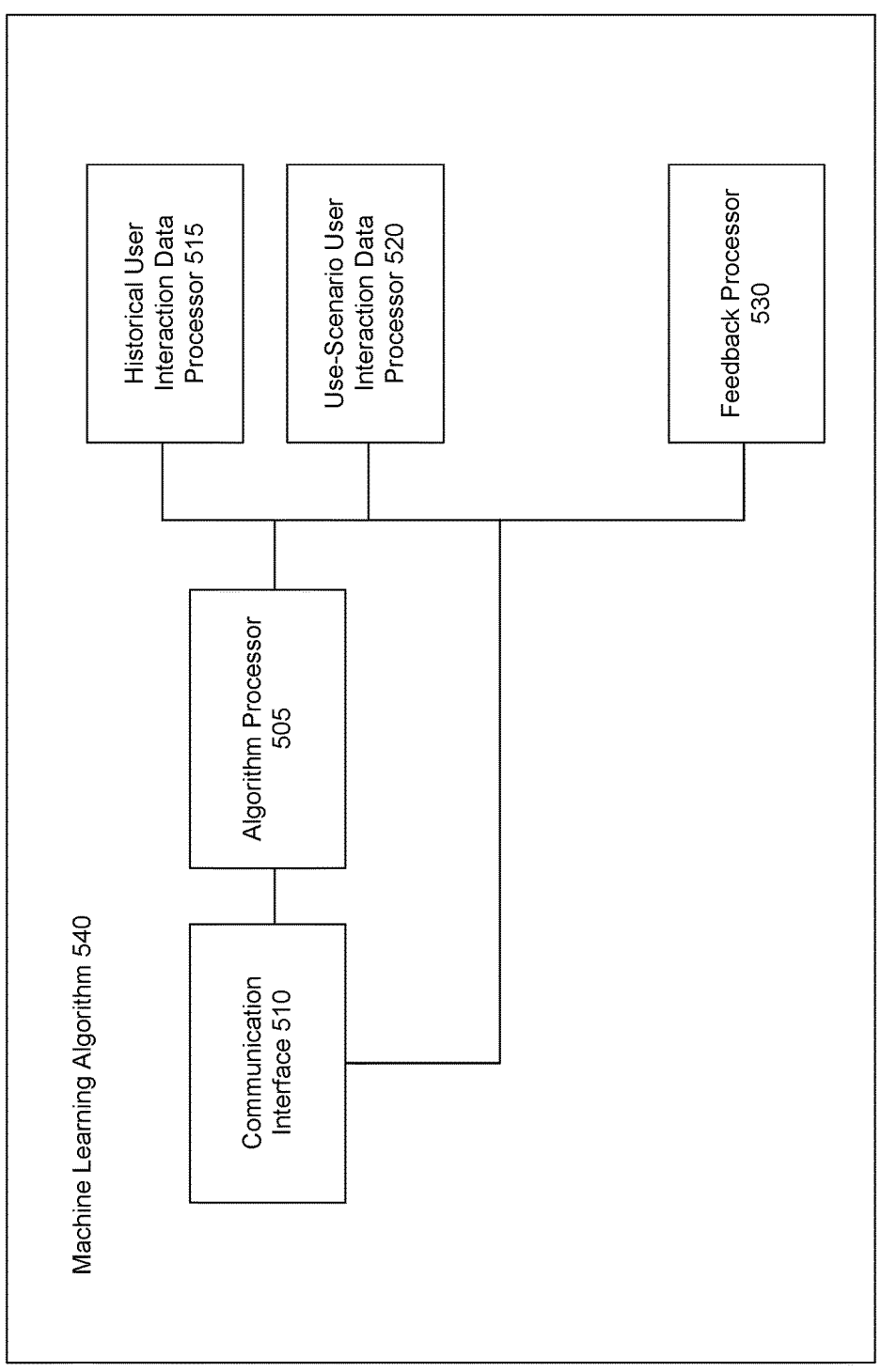
FIG. 5 is a schematic representation of a machine learning algorithm module within the application backend according to an exemplary embodiment.

With reference to FIG. 5, machine learning algorithm 540 may be part of an application backend and may predict when there is a behavioral biometric use-print mismatch. Machine learning algorithm 540 may include a communication interface 510 as well as an algorithm processor 505 coupled to a plurality of additional processors including historical user interaction data processor 515, use-scenario user interaction data processor 520, and feedback processor 530. The processors of FIG. 5 may include microprocessors and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. It should be appreciated that while FIG. 5 depicts multiple discrete processors, the machine learning algorithm may be accomplished by any number of processors including a single processor.

Machine learning algorithm 540 may receive a number of inputs from the service provider backend through communication interface 510. These inputs may include historical user interaction data stored in a database. The historical user interaction data may be a behavioral biometric use-print. The inputs may also include user interaction data for a specific attempted use scenario for a user. This data may be input into machine learning algorithm 540 as raw data, or formatted in various ways, such as deriving specific metrics from the data, preparing the data for comparison, etc. Additionally, machine learning algorithm 540 may receive feedback as a discrete type of input. The feedback may include feedback from a user relating to one or more interventions from a service provider backend. The accuracy of a machine learning algorithm 540 prediction may be inferred from the feedback.

The user interaction data received by the service provider backend for a specific use scenario may be utilized by processor 520 to help predict a behavioral biometric use-print mismatch. For instance, the interaction data go into processor 520 and be analyzed for context and relational data, as well as deriving additional metrics from the raw interaction data. Derived metrics may include typing rates, scrolling speeds, click through rates and speeds, etc. The relational data may be based off of derived metrics as well as metrics existing within the raw interaction data. For example, processor 520 may determine there is a relationship between a user's typing speed, which hand is used to type, and a common misspelling. The relational data may allow the machine learning algorithm 540 to more fully understand whether there is a behavioral biometric use-print mismatch. Other context and relational data may be considered. Processor 520 may leverage the context and relational data to favor or disfavor certain behavioral biometrics in determining the likelihood of a that a behavioral biometric use-print mismatch. This may be accomplished through assigning weights to different behavioral biometrics.

Historical user interaction data processor 515 may provide the behavioral biometric use-print for comparison by algorithm processor 505. In some embodiments, historical user interaction data processor 515 may receive historical user interactions data from a database and then establish/ create a behavioral biometric use-print. The use-print may include metrics from the raw historical interaction data as well as derived additional metrics. Historical user interaction data processor 515 may analyze the use-print for context and relational data. Similar to processor 520, the relational data here may also allow the machine learning algorithm 540 to more fully understand whether there is a behavioral biometric use-print mismatch. Processor 515 may also determine which ongoing data is appropriate to add to an existing behavioral biometric use-print to further develop and refine that use-print. For example, if there is data that indicates a user is under stress, then that data should not become part of the baseline behavioral biometric use-print because then the system would be less capable of predicting behavioral biometric use-print mismatches and preventing fraudulent activity. Processor 515 may be in communication with feedback processor 530 to better understand what behavioral biometrics should be excluded or included in the behavioral biometric use-print.

The relational and contextual information established by processors 515 and 520 may be used by algorithm processor 505 in making a prediction as to whether there is a behavioral biometric use-print mismatch. Algorithm processor 505 may compare the behavioral biometric use-print with the user interactions to determine and predict if there is a behavioral biometric use-print mismatch. The comparison may entail comparing similar interaction data points for deviations. For instance, the behavioral biometric use-print may include a typing speed and the monitored interaction data may also include a typing speed, and those two typing speeds may be compared. In an example where a user is attempting to access a financial account for the purpose of a funds transfer, there may be many interaction datapoints that may be compared to the user's behavioral biometric use-print. For instance, software application selection data including contact pressure and finger contact area. This data may be compared against standardized application selection data for the user in the behavioral biometric use-print. Use patterns may also be compared when the user immediately clicks on the account login link once the application opens. The behavioral biometric use-print may include standard application use patterns for comparison. Once the login link is selected, in addition to typing speed, typing cadence may be compared against a standard as well as error rates and patterns for misspellings, password mis-entry etc. All of the interaction data monitored in the financial account login attempt may be compared with user standards existing within the behavioral biometric use-print. The behavioral biometric use-print may also include average deviation rates from certain interaction data so that immaterial deviations may be ignored. For example, if a user's standard typing speed is 100 words per minute, then the behavioral biometric use-print may also include a range that is +/−8 words per minute. The same sort of deviations may be included in other behavioral biometrics such as hand jitter when holding a smart phone, application selection pressure, scrolling speeds, etc. The comparison may look at differences between the values of the compared metrics, the differences outside of the normal variation of the metrics in the behavioral biometric use-print, both, or some other comparative measure. Importantly, the learning algorithm may test the relationships and dependencies between and among the numerous behavioral biometrics developed by processor 515 and processor 520.

In making a behavioral biometric use-print mismatch determination, Algorithm processor 505 may consider the risk level of a given user interaction attempt (e.g., what is the user attempting to do within a service provider application or a service provider webpage), the size of the behavioral biometric use-print, the amount of data in the user interactions data for the specific use scenario, relationships between metrics, between metrics and the interaction attempt, etc. The algorithm processor 505 may weight each metric and make predictions based on a complex analysis of all metrics, relative deviation in each metric, summing or subtracting deviations based on relationships with other metrics, increasing or decreasing relative weights based on established relationships between and among metrics, etc. The algorithm processor 505 may also adjust weighting and relationships based on feedback from previous predictions. Algorithm processor 505 may be able to test detected relationships and analyses based on these relationships through feedback on predictions over time.

Feedback processor 530 may help refine future predictions by further analyzing the correct prediction feedback. It may be the case that the prediction was correct but based on faulty reasoning/logic. In that case, the feedback is useful to train the learning algorithm by changing assumptions, weighting, revisiting perceived relationships, etc. In the event that the algorithm predicted correctly, and the prediction was based on a correct analysis, the feedback processor 530 may use the feedback to further reinforce the correct analysis. This may include changing weighting for factors that more strongly favor the correct analysis, etc.

The predictive models described herein can utilize a Bidirectional Encoder Representations from Transformers (BERT) models. BERT models utilize use multiple layers of so called "attention mechanisms" to process textual data and make predictions. These attention mechanisms effectively allow the BERT model to learn and assign more importance to words from the text input that are more important in making whatever inference is trying to be made.

The predictive models described herein may utilize various neural networks, such as convolutional neural networks ("CNNs") or recurrent neural networks ("RNNs"), to generate the exemplary models. A CNN may include one or more convolutional layers (e.g., often with a subsampling step) and then followed by one or more fully connected layers as in a standard multilayer neural network. CNNs may utilize local connections, and may have tied weights followed by some form of pooling which may result in translation invariant features.

A RNN is a class of artificial neural network where connections between nodes form a directed graph along a sequence. This facilitates the determination of temporal dynamic behavior for a time sequence. Unlike feedforward neural networks, RNNs may use their internal state (e.g., memory) to process sequences of inputs. A RNN may generally refer to two broad classes of networks with a similar general structure, where one is finite impulse and the other is infinite impulse. Both classes of networks exhibit temporal dynamic behavior. A finite impulse recurrent network may be, or may include, a directed acyclic graph that may be unrolled and replaced with a strictly feedforward neural network, while an infinite impulse recurrent network may be, or may include, a directed cyclic graph that may not be unrolled. Both finite impulse and infinite impulse recurrent networks may have additional stored state, and the storage may be under the direct control of the neural network. The storage may also be replaced by another network or graph, which may incorporate time delays or may have feedback loops. Such controlled states may be referred to as gated state or gated memory, and may be part of long short-term memory networks ("LSTMs") and gated recurrent units RNNs may be similar to a network of neuron-like nodes organized into successive "layers," each node in a given layer being connected with a directed e.g., (one-way) connection to every other node in the next successive layer. Each node (e.g., neuron) may have a time-varying real-valued activation. Each connection (e.g., synapse) may have a modifiable real-valued weight. Nodes may either be (i) input nodes (e.g., receiving data from outside the network), (ii) output nodes (e.g., yielding results), or (iii) hidden nodes (e.g., that may modify the data en route from input to output). RNNs may accept an input vector x and give an output vector y. However, the output vectors are based not only by the input just provided in, but also on the entire history of inputs that have been provided in in the past.

For supervised learning in discrete time settings, sequences of real-valued input vectors may arrive at the input nodes, one vector at a time. At any given time step, each non-input unit may compute its current activation (e.g., result) as a nonlinear function of the weighted sum of the activations of all units that connect to it. Supervisor-given target activations may be supplied for some output units at certain time steps. For example, if the input sequence is a speech signal corresponding to a spoken digit, the final target output at the end of the sequence may be a label classifying the digit. In reinforcement learning settings, no teacher provides target signals. Instead, a fitness function, or reward function, may be used to evaluate the RNNs performance, which may influence its input stream through output units connected to actuators that may affect the environment. Each sequence may produce an error as the sum of the deviations of all target signals from the corresponding activations computed by the network. For a training set of numerous sequences, the total error may be the sum of the errors of all individual sequences.

FIG. 6 illustrates an exemplary method for detecting and defending against a digital scam-in-progress according to an embodiment of the invention. The actions of the method depicted in FIG. 6 may be carried out by a service provider backend in conjunction with an application or web browser running on a user device and may result in predicting when a user's actions materially deviate from that user's behavioral biometric use-print, and based on that prediction, providing interventions to defend against a potential scam.

At step 610, a service provider backend may monitor user interactions with an electronic device such as a smart phone or a desktop/laptop computer. These interactions may be within a software application or within a webpage, but may also be with respect to general usage of the electronic device. If the electronic device is a smart phone, then the user may normally hold the phone in a certain hand during use, or may hold the phone in one hand for certain tasks and the other hand for other tasks. The user type with one hand, the other, or both, and the typing may be of a certain pace and/or cadence. The cadence may be word-based, sentence-based, etc. The user may routinely misspell certain words or make repeated grammatical mistakes for certain words, phrases, rules, etc. The user may hold the phone in a certain orientation for various tasks, at certain elevations, with certain pressures in certain screen locations, etc. The user may also use distinct swipe and/or tap speeds, frequencies, cadences, pressures, right-hand vs. left hand swiping, etc. The same is true of zoom-in and zoom-out functions. Other phone specific gestures may be repeatable and therefore distinguishing for a certain user. Eye movements and focus patterns on the smart phone screen may also be monitored and may help distinguish a particular user. Area of contact with the screen and location of contact for certain functions may also help distinguish a particular user. Hand jerkiness or stillness may be monitored with internal smartphone accelerometers and may help distinguish a user's normal smartphone use with use of the smartphone under some type of stress. These are a non-limiting example of some of the characteristics of a user's interaction with a smartphone.

In the event that the electronic device is a desktop or laptop computer, then there are potentially other user interaction characteristics. In the event a laptop or a desktop monitor has a touchscreen, then many of the characteristics described above might apply to the desktop/laptop scenario as well. Additionally, there is keyboard interactions characteristics such as typing speed, cadence, error rates, etc. Just as with the smartphone, the cadence may be word-based, sentence-based, etc. The user may routinely misspell certain words or make repeated grammatical mistakes for certain words, phrases, rules, etc. There may be grammatical stylizations. For example, a user may routinely use double spaces between sentences, use or not use an Oxford comma, etc. The user may select certain type font and sizing, as well as certain text formatting. With a mouse, there may be certain repeatable and distinguishing characteristics. For example, there may be a certain click speed, cadence, movement speed, hover or dwell times, use or not of a middle scroll wheel (including speed, cadence, frequency, etc.), frequency of use of the right mouse button, error rates for clicking, inversion of mouse buttons for left-handed users or for other preference-based reasons, etc. There may be a user preference for a using a track pad over a mouse or other means for pointer control such as a track point on a laptop. Additionally, some laptops include multiple left and right mouse buttons and usage of one set vs the other, or some combination depending on the current user interaction may help distinguish users. Within a web browser on a webpage, there may be webpage-based interaction preferences or user routines/patterns. For example, on a financial institution's webpage, a user might, as a normal course of interaction, review news first, then log into the user's account, then check outstanding credit card balances, current statements, etc. in any number of normal, standard, and/or repeatable order. In addition to browsing pattern, there is scrolling speed, cadence, mouse movements, click cadence and frequency, mouse hover and dwell times, etc. Again, these are a non-limiting example of some of the characteristics of a user's interaction with a desktop/laptop computer.

In one embodiment, an attempted use-scenario may involve a user attempting to access one of his or her financial accounts within a service provider application for the purpose of making a funds transfer. The user may tap on the application icon with a certain finger, taking up a certain amount of area on the smart phone screen, and with a certain pressure. The application may open and the user may immediately click on a link for logging into the user's financial account. This link may, in turn, present a prompt for login credentials, such as user name and password. The user may enter a user name by typing on a virtual keyboard on the smart phone screen of the electronic device. The user may type the user name with either or both hands. The user may type with a certain speed and/or cadence. The user may enter the user name as intended, or make one or more mistakes that the user must correct. The same is true when entering the password, the user may, or may not, elect to show the password on the user's screen, may make one or more typos or enter the incorrect password a number of times before entering the correct password. Each of these steps may be completed while holding the phone with a given level of pressure and a certain level of stability (i.e., presence of or lack of jitter), as well holding the phone in a certain orientation (e.g., elevation, attitude, etc.). Step 610 may monitor and collect this interaction data, as well as other interaction data not explicitly discussed.

At step 620, the collected interaction data may be passed to a machine learning algorithm as an input. Additionally, a behavioral biometric use print for the user may be accessed and provided to the machine learning algorithm as a second input.

At step 630, the machine learning algorithm may take use the inputs to predict when there is a behavioral biometric use-print mismatch with the monitored user interaction data. The machine learning analysis may entail comparing similar interaction data points for deviations. For instance, the behavioral biometric use-print may include a typing speed and the monitored interaction data may also include a typing speed, and those two typing speeds may be compared. In the example provided above where a user is attempting to access a financial account for the purpose of a funds transfer, there are many interaction datapoints that may be compared to the user's behavioral biometric use-print. For instance, software application selection data including contact pressure and finger contact area. This data may be compared against standardized application selection data for the user in the behavioral biometric use-print. Use patterns may also be compared when the user immediately clicks on the account login link once the application opens. The behavioral biometric use-print may include standard application use patterns for comparison. Once the login link is selected, in addition to typing speed, typing cadence may be compared against a standard as well as error rates and patterns for misspellings, password mis-entry etc. All of the interaction data monitored in the financial account login attempt may be compared with user standards existing within the behavioral biometric use-print. The behavioral biometric use-print may also include average deviation rates from certain interaction data so that immaterial deviations may be ignored. For example, if a user's standard typing speed is 100 words per minute, then the behavioral biometric use-print may also include a range that is +/−8 words per minute. The same sort of variation ranges may be included in other behavioral biometrics such as hand jitter when holding a smart phone, application selection pressure, scrolling speeds, etc. The comparison may look at differences between the values of the compared metrics, the differences outside of the normal variation of the metrics in the behavioral biometric use-print, both, neither, or some other comparative measure. Importantly, the learning algorithm may develop an understanding of relationships and dependencies between and among the numerous behavioral biometrics. Some of these relationships and dependencies may be specific to a certain user's behavioral biometrics, and others may be applicable on a global basis.

In making a behavioral biometric use-print mismatch determination, the machine learning algorithm may consider the risk level of a given use case scenario (e.g., what is the user attempting to do within a software application or on a webpage), the size of the behavioral biometric use-print, the amount of data in the monitored user interactions from step 610, relationships between metrics, between the interaction attempt and metrics, etc. The machine learning algorithm may weigh each metric and make predictions based on a complex analysis of all metrics, relative deviation in each metric, summing or subtracting deviations based on relationships with other metrics, increasing or decreasing relative weights based on established relationships between and among metrics, etc. The machine learning algorithm may also adjust weighting and relationships based on feedback from previous predictions. The machine learning algorithm may be able to test detected relationships and analyses based on these relationships through feedback on predictions over time.

A prediction by the machine learning algorithm of a behavioral biometric use-print mismatch may result in one of two determinations. The first is that the person who is using the electronic device is not the user (e.g., is instead a scammer making unauthorized use of the electronic device), and the second is that the user is under stress. The stress may be a result of any number of factors such as paying a large bill or pressure from a third-party to perform some detrimental financial action. The machine learning algorithm may be capable of determining the difference between the sources of user stress as a result of the comparison and analysis of user interaction data with the behavioral biometric use-print. This is because stresses such as those resulting from a user paying a large bill may already be accounted for in the behavioral biometric use-print through the user interaction data collected over time. The machine learning algorithm may take this into account in its analysis of material deviations from the behavioral biometric use-print. Thus, the behavioral biometric use-print may account for the fact that a particular user feels stress when paying a large bill and the surrounding behavioral biometrics may reflect that stress in a measurable way that is understood and appreciated by the machine learning algorithm. Additionally, the machine learning algorithm may have visibility into the use-case from which the user interaction data is collected. So it may be known that the user is attempting to pay a large bill, and therefore, the machine learning algorithm may already anticipate a heightened stress level. The remaining, and unaccounted-for cause of increased user stress may be a result of pressure by a third-party to take some sort of detrimental financial action. This is the sort of scenario that the method may want to detect and control/prevent.

When the machine learning algorithm predicts a behavioral biometric use-print mismatch and determines that a user is under stress, then in step 640, interventions may be provided to electronic user device. The interventions may take many forms and may be dependent on the attempted use-scenario. For example, if the user is attempting to change his or her personal information including a login password, the intervention may be a temporary disablement of the password change function, sending out notification/verification communications through secondary means such as text message, email, etc., step-up authentication, pop-up dialogue boxes, etc. In the use-scenario where a user is attempting a funds transfer, the intervention may include many of these same interventions, but the specific intervention may be dictated by the attempted transfer amount, the degree to which there was a behavioral biometric use-print mismatch (e.g., the level of user stress), etc. Moreover, pop-ups and other communication attempts may include warnings, questions, etc. In one instance, a pop-up dialogue box may inquire if the user's actions are being currently being prompted by any third-party. In another embodiment, a pop-up may simply provide a notification warning that the system suspects outside influence in the current attempted financial transaction and there may be a fraud in-progress. Other notifications, warnings, and/or questions may be provided. Furthermore, there may be more than one intervention and the interventions may ramp up in number and severity based on the attempted use and the amount of time available to intervene. If there is a large behavioral biometric use-print mismatch and the user is attempting a withdraw or transfer, then the method may ramp up the intervention more quickly, including blocking the attempted financial transaction. However, if the user is slowly progressing toward a financial withdraw or transfer with a small or average behavioral biometric use-print mismatch, then the method may take a slower approach to its intervention at step 640. The type, number, ramp rate, etc. of the interventions may also be a function of the machine learning algorithm. The machine learning algorithm may predict the most effective intervention strategy based on all the data available on the type of attempted user interaction, the degree to which there was a behavioral biometric use-print mismatch, the speed of the user interaction, etc. The intervention strategy predictions may also be refined through feedback over time.

At step 650, there may be feedback from the user based on the intervention provided in step 640. For example, if the intervention was a pop-up box with a question or verification, then there may be a user response at step 650 before the attempted use continues. The feedback is provided to the machine learning algorithm to train, further refine, and improve the machine learning algorithm. The user feedback data may help train the machine learning algorithm in a variety of different ways. For example, if the user feedback is indicates an incorrect prediction, for example, a negative response to a pop-up with a question about third-party influence, then the machine learning algorithm will be able to refine the predictions and change/optimize weighting and relationships that led to the incorrect prediction. This includes an incorrect prediction that there was user stress, or the possibility that there was increased user stress, but that it was attributable to some other factor that was not controlled for by the behavioral biometric use-print. The same may be true for feedback indicating that the machine learning algorithm correctly predicted increased user stress due to third-party pressure. This feedback may be useful to more positively reinforce correct predictions, or to make refinements in the case where the machine learning algorithm may have made the correct prediction, but for faulty reasons. This may include changing weighting for factors that more strongly favor the correct analysis, etc.

With continued feedback and training of the machine learning algorithm over time, the machine learning algorithm may not only become more accurate, but also more efficient. This is because less computing resources are required as the machine learning algorithm becomes more confident in its predictions. Thus, not only is the accuracy of the predictions improved over time, but the functioning of the computer is also improved over time as the machine learning algorithm is trained.

In some aspects, the techniques described herein relate to a method for fraud prevention using behavioral biometrics, the method including the steps of: recording, by a processor, a plurality of behavioral biometrics of a user interacting with a user device; generating, by the processor and based on the recorded plurality of behavioral biometrics, a behavioral biometric use-print for the user; storing, in a database, the behavioral biometric use-print; monitoring, by the processor, one or more behavioral biometrics of the user while the user accesses a user account on the user device; applying a machine learning algorithm to the one or more behavioral biometrics of the user and the user's behavioral biometric use-print to determine that there is a material deviation in at least one of the one or more behavioral biometrics from the user's behavioral biometric use-print; determine, by the processor and based on the material deviation, that the user is under stress; providing, by the processor, an intervention to the user device based on the determination that the user is under stress; and receiving user feedback on the intervention, whereby the user feedback is used as an input to the machine learning algorithm to train and refine the machine learning algorithm.

In some aspects, the techniques described herein relate to a method, wherein the user device is a smart phone with a mobile application associated with the user account.

In some aspects, the techniques described herein relate to a method, wherein the user device is a computer with a web browser capable of accessing a website associated with the user account.

In some aspects, the techniques described herein relate to a method, wherein the behavioral biometrics include at least one selected from a group of device holding preferences including, device orientation, screen focus, interaction gestures, screen interaction pressures, typing speed, typing error rates, typing habits including misspellings, browsing and interaction flow and order, scrolling speed, frequency, and cadence, click rates, frequency, and cadence, swipe speed, frequency, and cadence, jerkiness, stillness, and device elevation.

In some aspects, the techniques described herein relate to a method, wherein the behavioral biometric use-print for the user contains enough behavioral biometrics to uniquely identify the user.

In some aspects, the techniques described herein relate to a method, wherein the machine learning algorithm's determination of a material deviation is based on a degree of divergence from the user's behavioral biometric use-print and the monitored behavioral biometrics of the user while the user accesses a user account on the user device as well as a type of access attempted by the user in the user account.

In some aspects, the techniques described herein relate to a method, wherein the type of access attempted includes one or more of attempting a password change, attempting an address change, attempting a funds transfer transaction over a threshold amount.

In some aspects, the techniques described herein relate to a method, wherein the intervention to the user device includes a pop-up dialogue box window inquiring if the user's actions are currently being prompted by any third-party.

In some aspects, the techniques described herein relate to a method, wherein the intervention to the user device includes a change to privileges in the user account.

In some aspects, the techniques described herein relate to a method, wherein the change to privileges in the user account includes at least one selected from the group of requiring step-up authentication, reducing credit limits, lowering transfer amount maximums, and lowering cash advance maximums.

In some aspects, the techniques described herein relate to a system for using behavioral biometrics to prevent digital scams, the system including: a memory storing a behavioral biometric use-print for a user; and a processor configured to: record a plurality of behavioral biometrics of a user interacting with a user device; generate, based on the recorded plurality of behavioral biometrics, the behavioral biometric use-print for the user; monitor one or more behavioral biometrics of the user while the user accesses a user account on the user device; apply a machine learning algorithm to the one or more behavioral biometrics of the user and the user's behavioral biometric use-print to determine that there is a material deviation in at least one of the one or more behavioral biometrics from the user's behavioral biometric use-print; conclude, by the processor and based on the material deviation, that that the user is under stress; provide, by the processor, an intervention to the user device based on the conclusion that the user is under stress; and receive user feedback on the intervention, whereby the user feedback is used as an input to the machine learning algorithm to train and refine the machine learning algorithm.

In some aspects, the techniques described herein relate to a system, wherein the user device is a smart phone with a mobile application associated with the user account.

In some aspects, the techniques described herein relate to a system, wherein the user device is a computer with a web browser capable of accessing a website associated with the user account.

In some aspects, the techniques described herein relate to a system, wherein the behavioral biometrics include one or more of device holding preferences, device orientation, screen focus, interaction gestures, screen interaction pressures, typing speed, typing error rates, typing habits including misspellings, browsing and interaction flow and order, scrolling speed, frequency, and cadence, click rates, frequency, and cadence, swipe speed, frequency, and cadence, jerkiness, stillness, and device elevation.

In some aspects, the techniques described herein relate to a system, wherein the machine learning algorithm's determination of a material deviation is based on a degree of divergence from the user's behavioral biometric use-print and the monitored behavioral biometrics of the user while the user accesses a user account on the user device as well as a type of access attempted by the user in the user account.

In some aspects, the techniques described herein relate to a system, wherein the type of access attempted includes one or more of attempting a password change, attempting an address change, attempting a funds transfer transaction over a threshold amount.

In some aspects, the techniques described herein relate to a system, wherein the intervention to the user device includes a pop-up dialogue box window inquiring if the user is working in conjunction with any other person.

In some aspects, the techniques described herein relate to a system, wherein the intervention to the user device includes a change to privileges in the user account.

In some aspects, the techniques described herein relate to a system, wherein the change to privileges in the user account includes one or more of requiring step-up authentication, reducing credit limits, lowering transfer amount maximums, and lowering cash advance maximums.

In some aspects, the techniques described herein relate to a computer-readable non-transitory medium including computer-executable instructions that, when executed by at least one processor, perform procedures including the steps of: recording a plurality of behavioral biometrics of a user interacting with a user device; generating, based on the recorded plurality of behavioral biometrics, a behavioral biometric use-print for the user; monitoring one or more behavioral biometrics of the user while the user accesses a user account on the user device; applying a machine learning algorithm to the one or more behavioral biometrics of the user and the user's behavioral biometric use-print to determine that there is a material deviation in at least one of the one or more behavioral biometrics from the user's behavioral biometric use-print; concluding, by the processor and based on the material deviation, that that the user is under stress; providing, by the processor, an intervention to the user device based on the conclusion that the user is under stress; and receiving user feedback on the intervention, whereby the user feedback is used as an input to the machine learning algorithm to train and refine the machine learning algorithm.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A method for fraud prevention using behavioral biometrics, the method comprising the steps of:

recording, by a processor, a plurality of behavioral biometrics of a user interacting with a user device;

generating, by the processor and based on the recorded plurality of behavioral biometrics, a behavioral biometric use-print for the user;

storing, by the processor in a database, the behavioral biometric use-print;

monitoring, by the processor, one or more behavioral biometrics of the user while the user accesses a user account on the user device;

applying, by the processor, a machine learning algorithm to the one or more behavioral biometrics of the user and the user's behavioral biometric use-print to determine that there is a material deviation in at least one of the one or more behavioral biometrics from the user's behavioral biometric use-print;

determine, by the processor and based on the material deviation, that the user is under stress;

providing, by the processor, an intervention to the user device based on the determination that the user is under stress, wherein the intervention comprises at least one of:

(i) a pop-up dialogue box window inquiring if the user's actions are currently being prompted by any third-party, or (ii) a change to privileges in the user account comprising at least one selected from the group of requiring step-up authentication, reducing credit limits, lowering transfer amount maximums, and lowering cash advance maximums; and receiving, by the processor, user feedback on the intervention, whereby the user feedback is used as an input to the machine learning algorithm to train and refine the machine learning algorithm;

improving, by the processor, the machine learning algorithm by:

optimizing weights of established relationships between and among metrics;

optimizing relationships based on the user feedback; and testing, by the processor using the machine learning algorithm, detected relationships and analyses based on the relationships through feedback on predictions over time.

2. The method of claim 1, wherein the user device is a smart phone with a mobile application associated with the user account.

3. The method of claim 1, wherein the user device is a computer with a web browser capable of accessing a website associated with the user account.

4. The method of claim 1, wherein the behavioral biometrics comprise at least one selected from a group of: device holding preferences comprising, device orientation, screen focus, interaction gestures, screen interaction pressures, typing speed, typing error rates, typing habits including misspellings, browsing and interaction flow and order, scrolling speed, frequency, and cadence, click rates, frequency, and cadence, swipe speed, frequency, and cadence, jerkiness, stillness, and device elevation.

5. The method of claim 1, wherein the behavioral biometric use-print for the user contains enough behavioral biometrics to uniquely identify the user.

6. The method of claim 1, wherein the machine learning algorithm's determination of a material deviation is based on a degree of divergence from the user's behavioral biometric use-print and the monitored behavioral biometrics of the user while the user accesses a user account on the user device as well as a type of access attempted by the user in the user account.

7. The method of claim 6, wherein the type of access attempted comprises one or more of attempting a password change, attempting an address change, attempting a funds transfer transaction over a threshold amount.

8. A system for using behavioral biometrics to prevent digital scams, the system comprising:

a memory storing a behavioral biometric use-print for a user; and a processor configured to:

record a plurality of behavioral biometrics of a user interacting with a user device;

generate, based on the recorded plurality of behavioral biometrics, the behavioral biometric use-print for the user;

monitor one or more behavioral biometrics of the user while the user accesses a user account on the user device;

apply a machine learning algorithm to the one or more behavioral biometrics of the user and the user's behavioral biometric use-print to determine that there is a material deviation in at least one of the one or more behavioral biometrics from the user's behavioral biometric use-print;

conclude, based on the material deviation, that the user is under stress;

provide an intervention to the user device based on the conclusion that the user is under stress, wherein the intervention comprises at least one of:

(i) a pop-up dialogue box window inquiring if the user's actions are currently being prompted by any third-party, or (ii) a change to privileges in the user account comprising at least one selected from the group of requiring step-up authentication, reducing credit limits, lowering transfer amount maximums, and lowering cash advance maximums; and receive user feedback on the intervention, whereby the user feedback is used as an input to the machine learning algorithm to train and refine the machine learning algorithm;

improving the machine learning algorithm by:

optimizing weights of established relationships between and among metrics;

optimizing relationships based on the user feedback; and testing, using the machine learning algorithm, detected relationships and analyses based on the relationships through feedback on predictions over time.

9. The system of claim 8, wherein the user device is a smart phone with a mobile application associated with the user account.

10. The system of claim 8, wherein the user device is a computer with a web browser capable of accessing a website associated with the user account.

11. The system of claim 8, wherein the behavioral biometrics comprise one or more of: device holding preferences, device orientation, screen focus, interaction gestures, screen interaction pressures, typing speed, typing error rates, typing habits including misspellings, browsing and interaction flow and order, scrolling speed, frequency, and cadence, click rates, frequency, and cadence, swipe speed, frequency, and cadence, jerkiness, stillness, and device elevation.

12. The system of claim 8, wherein the machine learning algorithm's determination of a material deviation is based on a degree of divergence from the user's behavioral biometric use-print and the monitored behavioral biometrics of the user while the user accesses a user account on the user device as well as a type of access attempted by the user in the user account.

13. The system of claim 12, wherein the type of access attempted comprises one or more of attempting a password change, attempting an address change, attempting a funds transfer transaction over a threshold amount.

14. A computer-readable non-transitory medium comprising computer executable instructions that, when executed by at least one processor, perform procedures comprising the steps of:

recording a plurality of behavioral biometrics of a user interacting with a user device;

generating, based on the recorded plurality of behavioral biometrics, a behavioral biometric use-print for the user;

monitoring one or more behavioral biometrics of the user while the user accesses a user account on the user device;

applying a machine learning algorithm to the one or more behavioral biometrics of the user and the user's behavioral biometric use-print to determine that there is a material deviation in at least one of the one or more behavioral biometrics from the user's behavioral biometric use-print;

concluding, based on the material deviation, that the user is under stress;

providing an intervention to the user device based on the conclusion that the user is under stress, wherein the intervention comprises at least one of:

(i) a pop-up dialogue box window inquiring if the user's actions are currently being prompted by any third-party, or (ii) a change to privileges in the user account comprising at least one selected from the group of requiring step-up authentication, reducing credit limits, lowering transfer amount maximums, and lowering cash advance maximums; and receiving user feedback on the intervention, whereby the user feedback is used as an input to the machine learning algorithm to train and refine the machine learning algorithm;

improving the machine learning algorithm by:

optimizing weights of established relationships between and among metrics;

optimizing relationships based on the user feedback; and testing, using the machine learning algorithm, detected relationships and analyses based on the relationships through feedback on predictions over time.

\* \* \* \* \*